United States Patent
Graefe et al.

(10) Patent No.: US 7,577,647 B2
(45) Date of Patent: Aug. 18, 2009

(54) COMBINING NESTED AGGREGATORS

(75) Inventors: Goetz Graefe, Bellevue, WA (US);
Oliver N. Seeliger, Sammamish, WA (US); Torsten W. Grabs, Bellevue, WA (US); Yevgeniy L. Kogan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 222 days.

(21) Appl. No.: 11/296,558

(22) Filed: Dec. 7, 2005

(65) Prior Publication Data

US 2007/0130110 A1  Jun. 7, 2007

(51) Int. Cl.
*G06F 17/30* (2006.01)
(52) U.S. Cl. .................. 707/4; 707/1; 707/2; 707/3; 707/5; 709/203
(58) Field of Classification Search .............. 707/1, 707/2, 3, 4, 5; 709/203
See application file for complete search history.

(56) References Cited

U.S. PATENT DOCUMENTS

| | | | |
|---|---|---|---|
| 5,412,804 A * | 5/1995 | Krishna | 707/2 |
| 5,797,136 A * | 8/1998 | Boyer et al. | 707/2 |
| 5,960,427 A * | 9/1999 | Goel et al. | 707/4 |
| 6,564,204 B1 * | 5/2003 | Amundsen et al. | 707/2 |
| 2004/0193575 A1 * | 9/2004 | Chen et al. | 707/3 |
| 2006/0031848 A1 * | 2/2006 | Balle et al. | 719/318 |

OTHER PUBLICATIONS

Krishnaprasad, et al., "Towards an Industrial Strength SQL/XML Infrastructure", *Computer Society*: Proceedings of the 21st International Conference on Data Engineering, (2005), 10 pgs.
Shanmugasundaram, et al., "Efficiently Publishing Relational Data as XML Documents", *The VLDB Journal 10*: Digital Object Identifier (DOI), (Jun. 28, 2001) 133-154.

* cited by examiner

*Primary Examiner*—Jean B Fleurantin
*Assistant Examiner*—Phong Nguyen

(57) ABSTRACT

A method and system for transforming a query tree that includes more than one aggregator. The method includes identifying a first aggregator in the query tree, identifying a second aggregator that is located below the first aggregator in the query tree, and merging the second aggregator with the first aggregator to form a merged aggregator.

8 Claims, 8 Drawing Sheets

(PRIOR ART)

(PRIOR ART)

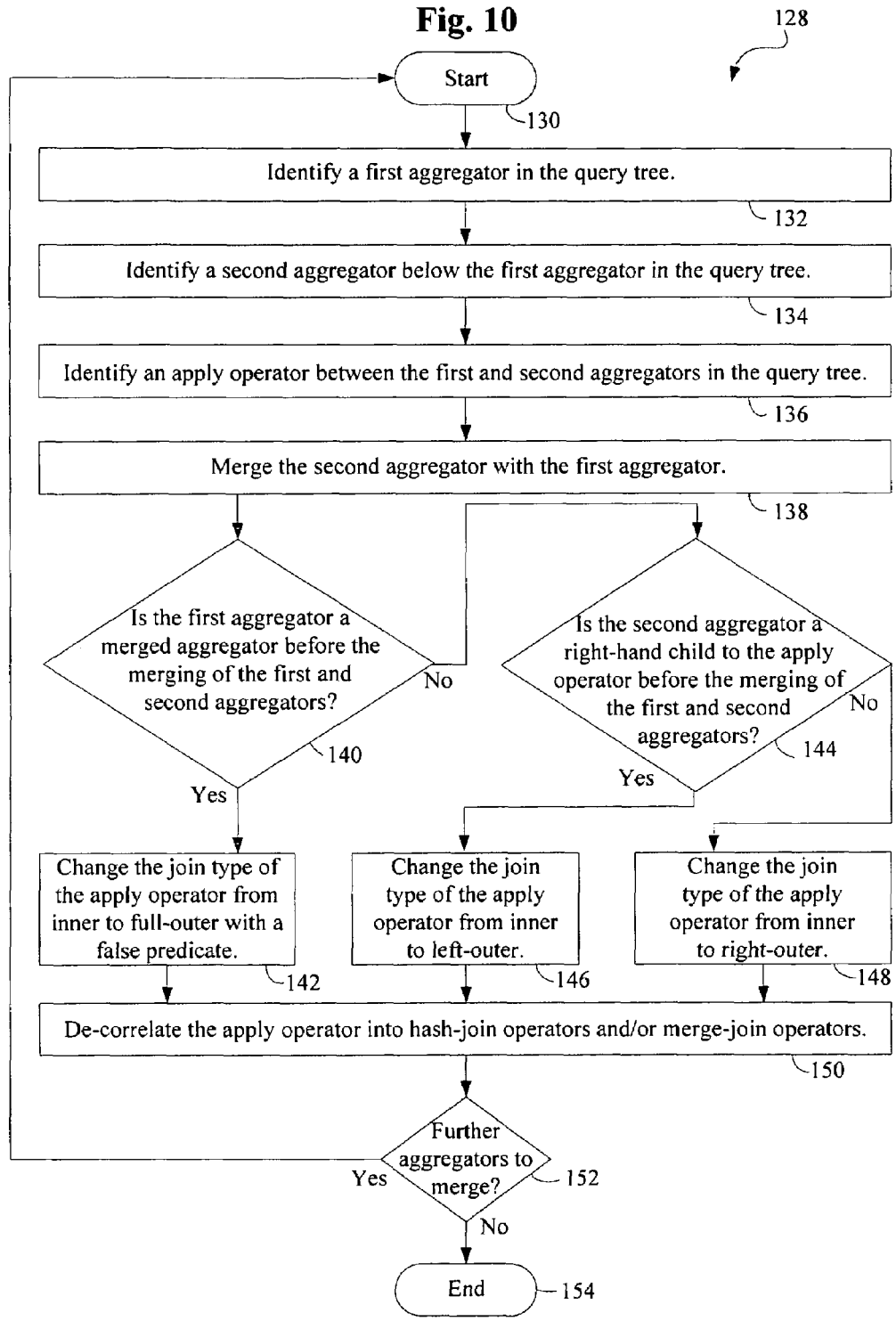

COMBINING NESTED AGGREGATORS

TECHNICAL FIELD

The technical field is generally the field of data processing. More specifically, the technical field is the field of nested aggregators.

BACKGROUND

Computer databases systems commonly are used for the storage of information or data. Referring to FIGS. 1-3, which illustrate an example computer database system 10, the information typically is stored in a database storage device 12, for example, one or more storage devices that are included in, or coupled to, a database server 14. The database storage device can be, for example, a computer-readable medium, e.g., a RAM, ROM, EEPROM, flash memory, CDROM, DVD, optical disk, magnetic cassette, magnetic tape, magnetic disk drive, or any other medium that can be used to store information and which can be accessed by a computer.

Users 16 interface with the computer database system via client computers 18, e.g., individual workstations, dumb terminals, personal computers (including hand-held or laptop devices), and the like. In most cases, the client computers operate under a client operating system, for example, the WINDOWS operating system from Microsoft Corporation of Redmond, Wash. The database server generally operates independently of the client computers, and runs under a server operating system. In other example computer systems, instead of there being a client computer and a separate database server, there is only one computer system that includes the function of both the client computer and the database server.

The client computers are coupled to the database server via a network 20. The network 20 can be, for example, a local area network ("LAN"), a wide area network ("WAN"), an intranet, the Internet, or some other network medium that facilitates the transmission of information between the client computers 18 and the database server 14. Any number of protocols, e.g., hypertext transfer protocol ("HTTP"), can be used to communicate the information between the client computers and the database server.

Most computer database systems 10 include a database management system ("DBMS") 22, which includes a set of programs that are used to control the interface between a client computer 18 and the database storage device 12. More specifically, the DBMS is configured to help the user 16 perform common tasks, for example, the creation of the database, the retrieval of information from the database, the adding of information to the database, and the replication of information in the database.

DBMSs 22 are designed for compatibility with relational databases 24, in which, database information is organized in a set of tables of data that are interrelated to one another. Each table includes a plurality of data records or tuples (rows), with each record including multiple data attributes (columns). A field is the intersection of a single column with a single row, and each field typically contains a scalar value. Also, a DMBS can be configured to be compatible with an object database, i.e., a database where the information is in the form of objects.

The DBMS 22 handles data requests from the users 16, and formats and sends the results, i.e., subsets of the information included in the database 24, back to the users' client computers 18. User requests can include database queries ("queries"), which are logical expressions that are input to the client computers by the users. Because the data in a relational database is distributed across multiple tables, a query usually draws data from more than one table. A user formulates a query using a query language, such as SQL (SQL stands for Structured Query Language). The user inputs the query using an application program 26, which is usually resident in the client computer. Examples of database systems, which include a query language, include SQL SERVER from Microsoft Corporation (SQL stands for Structured Query Language); DB2 from IBM of Armonk, N.Y.; SYBASE IQ from Sybase of Dublin, Calif.; and ORACLE 91R2 from Oracle of Redwood Shores, Calif.

Each query specifies the information to be retrieved from the database 24 and the manner in which the information is to be manipulated or evaluated to provide a useful result. If any of the information in the database satisfies the conditions of the user's query, that information will be retrieved from the database, and returned to the client computer 18.

Before a query can be executed by the DBMS 22, the query must be processed and translated into a format that is appropriate for execution by the DBMS. Initially, the query is received by the DBMS and validated, e.g., the DBMS validates that an authorized user 16 has submitted the query, and that the tables referenced in the query are valid tables that are included in the database 24. After the query validation step, the DBMS forwards the query to an engine 28 that is included in the database server 14 and conceptually included in the DBMS. The engine is the portion of the DBMS that directly interacts with the database.

The engine 28 includes a parser 30, which parses the query into a query tree. The query tree is a tree structure that represents the components of the query, e.g., the terms and operators of the query. After the parsing step, the query tree is forwarded to a compiler 32, which is also included in the engine and includes an optimizer 34 and a code generator 36. The optimizer determines an efficient method ("query execution plan") for implementing the query tree and accessing the information from the database 24 in the allotted time, i.e., the optimizer performs query optimization.

The query execution plan is passed from the optimizer 34 to the code generator 36, which converts the query execution plan into a set of instructions suitable for satisfying the query. These instructions are passed to an execution unit 38, which also is included as part of the engine 28 in the database server 14. Operating under the control of these instructions, the execution unit generates calls to lower-level routines for retrieving relevant information from the database tables. After the instructions have been executed by the execution unit, the database server returns the results of the query back to the client computer 18, via the network 20. Or, in the case where there is only one computer, i.e., the client computer and the database server are one device, the results need not be transferred via the network.

In addition to supporting traditional types of information, many relational databases 24 also support extensible markup language ("XML") data. XML is a widely accepted markup language used to exchange data between dissimilar systems. The popularity of XML is due in large part to its flexibility for representing many kinds of information. SQL SERVER allows database information to be defined using an XML data type. This XML data can be searched, retrieved, and updated using SQL SERVER, as is done with traditional types of relational database information. The XML data included in the relational database can be large, can take a large amount of time to retrieve, and can require large amounts of storage space.

SQL SERVER provides functions that can be performed on the database tables. One type of function provided by SQL SERVER is the aggregate function. An aggregate function, or aggregator, is a function that applies to sets of rows (a "row set"), in a table rather than to a single row. More specifically, an aggregate function summarizes some characteristic of a row set. Thus, an aggregate function takes information from multiple rows of a database table, processes that information, and delivers an answer. The resulting answer is an aggregation of the information from the row set in a database table. Example aggregate functions provided by SQL SERVER include the COUNT, SUM, MAX, MIN, and AVG functions, which operate on a set of input scalar values and generate an aggregate value.

There are many scenarios in database system processing when there is a need to aggregate data from a row set into a complex scalar, referred to as "complex aggregation." Complex aggregation, performed as a function of a complex aggregator, assembles all pieces from its input into one output unit. The output unit has the characteristic that the individual pieces are not lost, i.e., the pieces are still conceivable in the output unit. The following is a list of several examples where there is a need to aggregate data from a row set into a complex scalar in SQL SERVER: 1) when formatting relational data as XML data (e.g., SELECT Contacts.* FROM Contacts FOR XML RAW, TYPE); 2) when serializing XQuery results (XQuery stands for XML query language and is a standardized way of searching through XML data) into an XML scalar by aggregating a row set representing XQuery sequence elements (e.g., SELECT xml_col.query ('for $a in /a return <NewA>{$a}</NewA>') FROM t); and 3) when constructing an array/collection/multi-set of complex-type data using a constructing aggregate function (e.g., SELECT construct_phone_number_list(construct_phone_number(t.number, t.type)) FROM t). The first two of the above example statements result in a row containing a scalar XML value, i.e., a single, unnamed column and a single row. The last example statement results in complex-type data containing a sequence of complex scalars of type phone_number and containing the number and the phone type.

More than one aggregator, including, for example, XML aggregators (i.e., aggregate functions that involve XML data), can be nested within a single query, thus, resulting in more than one aggregator being distributed throughout the query tree. Having aggregators, for example, XML aggregators, distributed throughout the query tree can result in degradation in performance and scalability of the query compared to cases where aggregation can be done in a streamable manner without nesting aggregators. This is because the execution of each XML aggregator can result in the materialization of potentially large intermediate results in memory or on disk. Also, because the XML aggregators are distributed throughout the query tree, the query tree is less efficient since the same XML data will be copied each time an aggregator is processed. Accordingly, there are many inefficiencies associated with query trees that include more than one aggregator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments discussed in greater detail in the Detailed Description include a method and a system for transforming a query tree that includes more than one aggregator. An exemplary method includes identifying a first aggregator in the query tree, identifying a second aggregator that is located below the first aggregator in the query tree, and merging the second aggregator with the first aggregator to form a merged aggregator.

In other more detailed features, the method can further include identifying an apply operator having a join type that is located between the first aggregator and the second aggregator in the query tree, and changing the join type of the apply operator during the transformation of the query tree. In addition, the method can further include creating a row set that is configured to be aggregated by the merged aggregator, configured to avoid materialization of intermediate results during aggregation, and configured to allow the merged aggregator to perform streaming aggregation.

Other features should become apparent from the following Detailed Description taken in conjunction with the accompanying drawings.

DESCRIPTION OF THE DRAWINGS

FIG. 10 is a flow diagram of an exemplary algorithm that represents the steps taken by an optimizer.

DETAILED DESCRIPTION

A query can include more than one nested aggregator. Below is an example query that requests a relational row set to be formatted as XML data and includes an XML aggregator nested within another XML aggregator.

SELECT
    Contacts.category AS "@Category",
    Contacts.first + ' ' + Contacts.last AS Name,
    (SELECT phone_type AS "@type", phone_number AS "text( )"
    FROM Phones
    WHERE Phones.ContactID=Contacts.ID
    FOR XML PATH('PhoneNumber'), TYPE
    ) AS PhoneNumbers,
    (SELECT age AS "@age", sex AS "@sex" , first AS "text( )"
    FROM Children
    WHERE Children.ParentID=Contacts.ID
    FOR XML PATH('Child'), TYPE

```
        ) AS Children
FROM Contacts
FOR XML RAW('Contact'), TYPE, ROOT('Contacts')
```

Assume that the above example query is processed by the database server 14 using the following input tables: the Phones table, the Children table, and the Contacts table, as shown below.

Phones Table:

| phone_type | phone_number   | id |
|------------|----------------|----|
| Mobile     | (555)123-4567  | 1  |
| work       | (555)456-7890  | 1  |
| Mobile     | (555)399-3367  | 2  |

Children Table:

| age | sex    | first | parentid |
|-----|--------|-------|----------|
| 4   | Male   | Nigel | 1        |
| 11  | Female | Leah  | 2        |
| 13  | Female | Helen | 2        |

Contacts Table:

| category | first | last   | contactid |
|----------|-------|--------|-----------|
| VIP      | Peter | Fonda  | 1         |
| VIP      | Nancy | Shmidt | 2         |

Based on the above tables, the above example query produces the following XML document:

```
<Contacts>
    <Contact Category="VIP">
        <Name>Peter Fonda</Name>
        <PhoneNumbers>
            <PhoneNumber
                type="mobile">(555)123-4567</PhoneNumber>
            <PhoneNumber
                type="work">(555)456-7890</PhoneNumber>
        </PhoneNumbers>
        <Children>
            <Child age="4" sex=" Male">Nigel </Child>
        </Children>
    </Contact>
    <Contact Category="VIP">
        <Name>Nancy Shmidt</Name>
        <PhoneNumbers>
            <PhoneNumber
                type="mobile">(555)399-3367</PhoneNumber>
        </PhoneNumbers>
        <Children>
            <Child age="11" sex="Female">Leah</Child>
            <Child age="13" sex="Female">Helen</Child>
        </Children>
    </Contact>
</Contacts>
```

Figure 1:
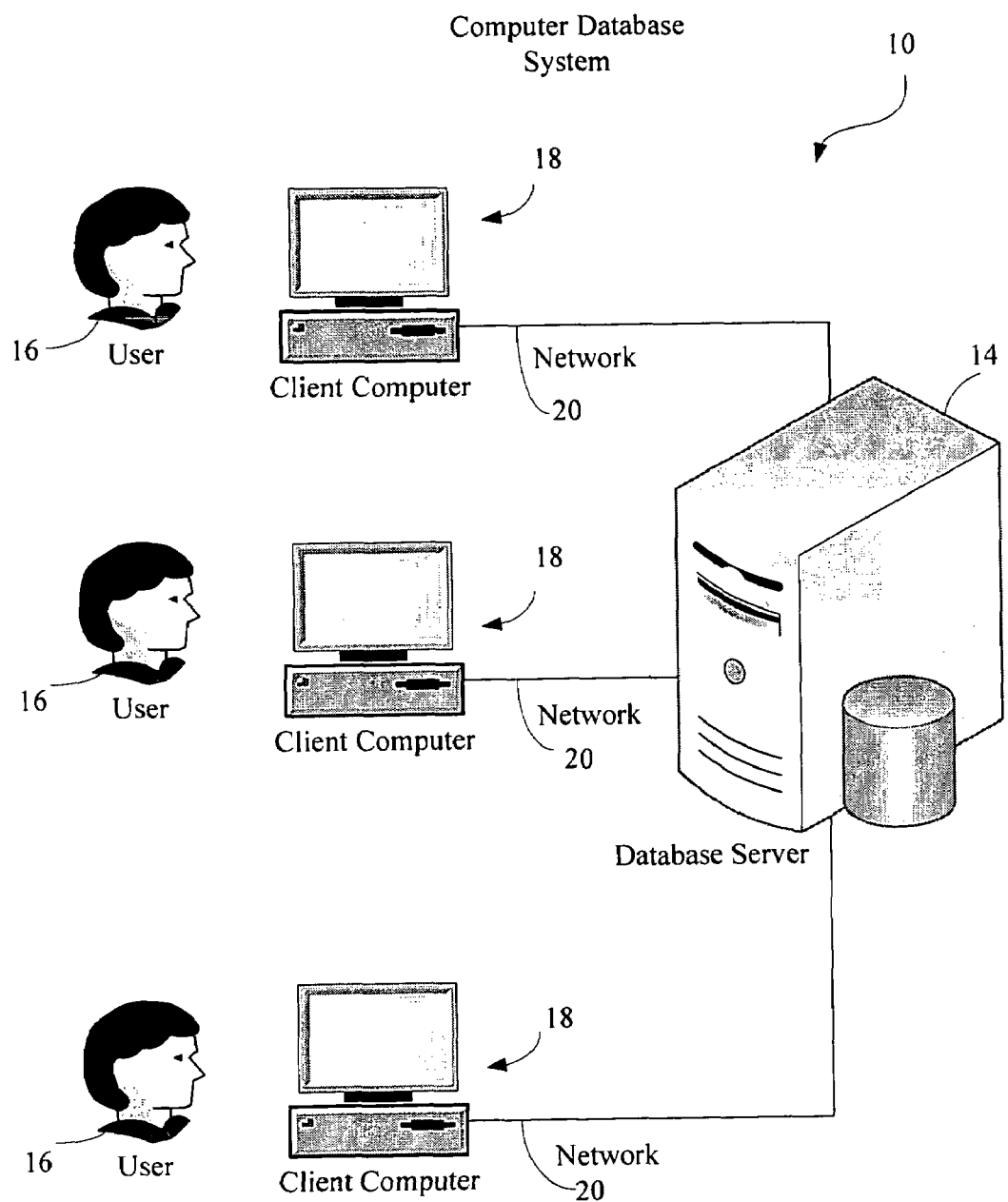
FIG. 1 is a schematic illustration of a computer database system.
Figure 2:
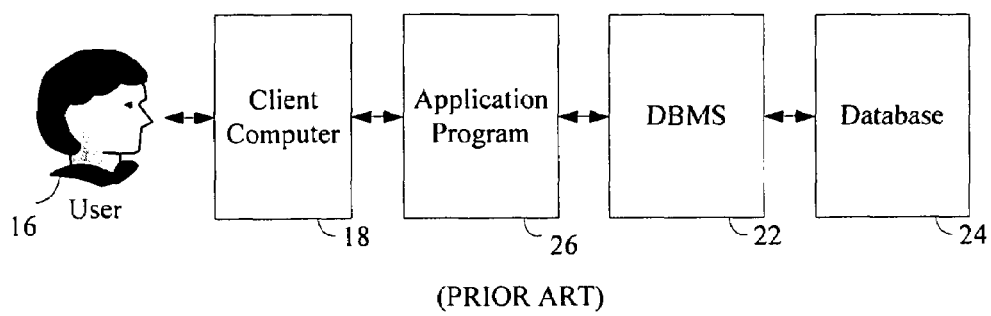
FIG. 2 is a block diagram of the computer database system of FIG. 1.
Figure 3:
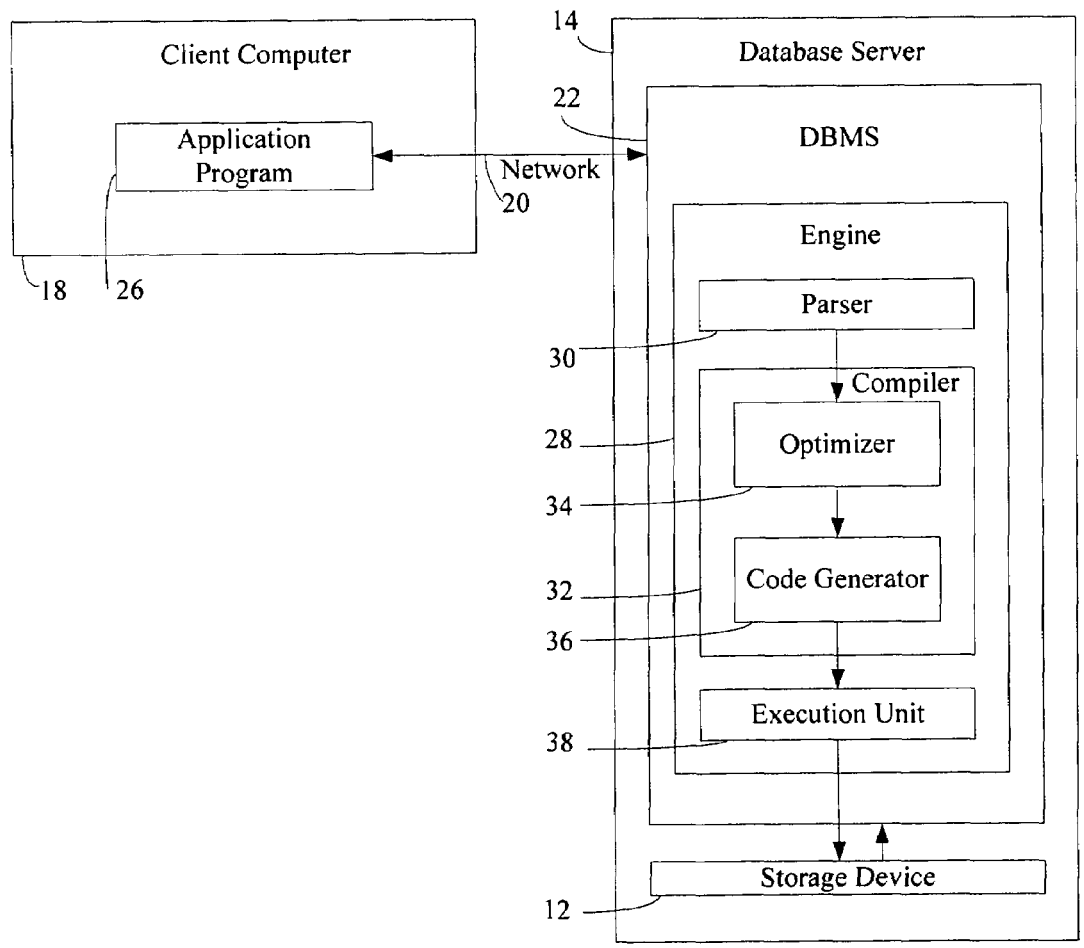
FIG. 3 is a block diagram of a client computer and database server that are included in the computer database system of FIG. 1.
Figure 4:
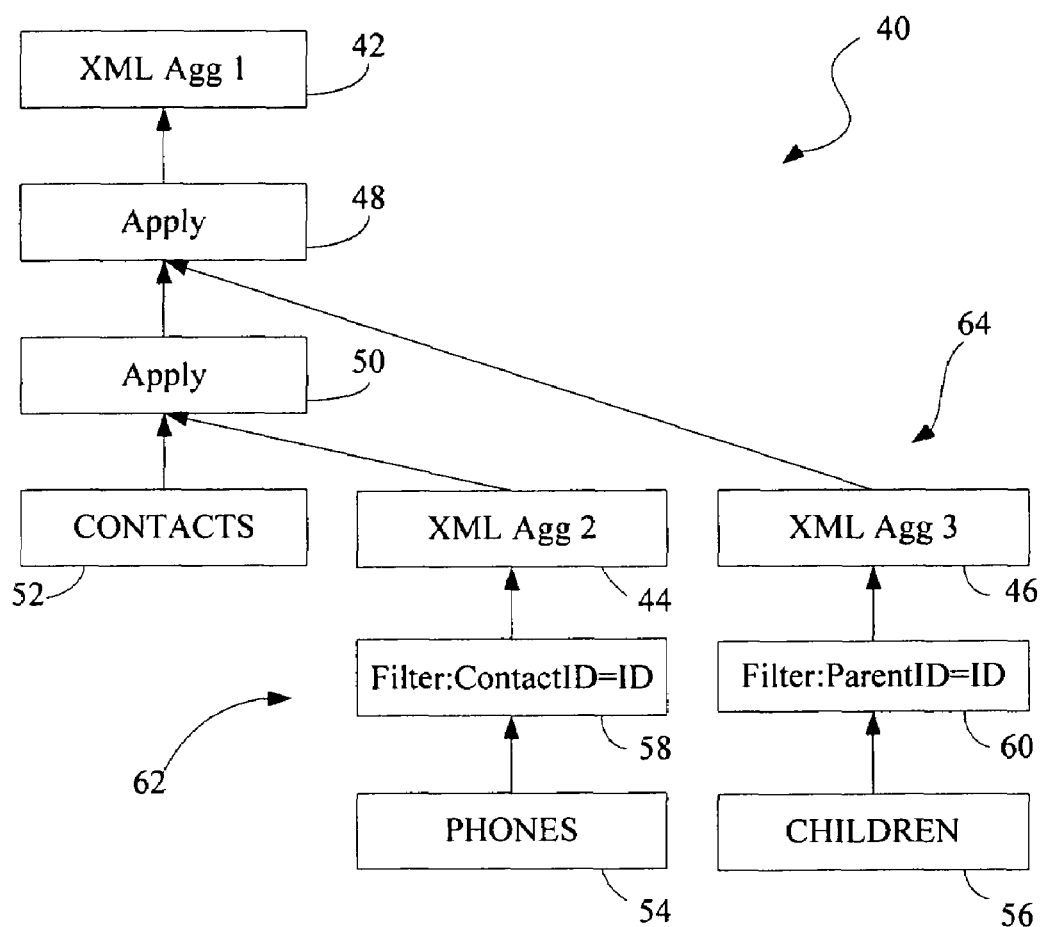
FIG. 4 is a block diagram of an example query tree.

FIG. 4 is a block diagram that illustrates the query tree 40 for the above example query. The query tree 40 includes three XML aggregators, i.e., XML Agg 1 42, XML Agg 2 44, and XML Agg 3 46; two Apply operators, i.e., a first Apply operator 48 and a second Apply operator 50; and three relational inputs, i.e., the Contacts table 52, the Phones table 54, and the Children table 56. XML Agg 1 42 corresponds to the following portion of the query:

```
SELECT
    Contacts.category AS "@Category",
    Contacts.first + ' ' + Contacts.last AS Name, ...
FROM Contacts
FOR XML RAW('Contact'), TYPE, ROOT('Contacts')
```

XML Agg 2 44 corresponds to the following portion of the query:

```
(SELECT phone_type AS "@type", phone_number AS "text( )"
FROM Phones
WHERE Phones.ContactID=Contacts.ID
FOR XML PATH('PhoneNumber'), TYPE
) AS PhoneNumbers
```

XML Agg 3 46 corresponds to the following portion of the query:

```
(SELECT age AS "@age", sex AS "@sex" , first AS "text( )"
FROM Children
WHERE Children.ParentID=Contacts.ID
FOR XML PATH('Child'), TYPE
) AS Children
```

The query tree 40 also includes two filters, i.e., the ContactID filter 58 and the Parent ID filter 60 for the Phones table and the Children table, respectively. While FIG. 4 illustrates a query tree having three aggregators 42-26, in other example queries, the query tree can have more than three aggregators and/or more than two Apply operators 48 and 50.

In FIG. 4, each Apply operator 48 and 50 performs a correlated join of its left-hand and right-hand inputs. In general, a Join operator combines data from more than one table into a single result table. Basically, the correlated join is a nested iteration where the right-hand side of the Apply operator is executed for each row on the left-hand side of the Apply operator, and the row from the left-hand side is passed into the right-hand side as a parameter.

While the above XML document reports the result for the whole query tree 40, the following is a discussion of some of the sub-queries 62 and 64 included in the query tree illustrated in FIG. 4. In particular, the intermediate result of the XML Agg 2 sub-query 62 when executed for the 'Peter Fonda' row from the Contacts table returns the following XML fragment:

```
<PhoneNumbers>
    <PhoneNumber type="mobile">(555)123-4567</PhoneNumber>
    <PhoneNumber type="work">(555)456-7890</PhoneNumber>
</PhoneNumbers>
```

Executing the XML Agg 3 sub-query 64 for 'Peter Fonda' returns the following XML fragment:

```
<Children>
    <Child age="4" sex="Male">Nigel</Child>
</Children>
```

There are two main performance and scalability issues when evaluating these types of queries 40, because the intermediate results of the aggregation can be large. The large aggregation results may get copied and aggregated multiple times because there are multiple levels of aggregation. Also, the Apply operators 48 and 50 are translated by the optimizer 34 into Nested-Loop Join operators since typically there is a correlation between the nested sub-queries. A Nested-Loop Join operator has inferior performance in comparison to a join between the same data sets without aggregation where the optimizer can pick more efficient implementations of the Apply operator, e.g., Merge-Join operators or Hash-Join operators.

For many queries, the performance and scalability issues can be mitigated by using tree transformations to transform query trees, e.g., the query tree 40 illustrated in FIG. 4, that include more than one aggregator, e.g., the XML aggregators 42-46, into query trees that can be more efficiently executed. In particular, a number of optimizations can be achieved by implementing the tree transformations, which combine several potentially nested aggregators into a single aggregator. During the optimization process, the optimizer 34 shapes the combined aggregator's input row set so that a combined aggregator can perform streaming aggregation (i.e., a steady and continuous aggregation process) into the target complex-type serialization format without buffering a considerable amount of data in memory or on disk 12. Also, the optimizer allows de-correlating of the Apply operators 48 and 50 that are included in the query tree, thus, allowing the selection of better join implementations.

The optimizations discussed herein implement the following three parts:

1. The combination of scalar complex-type constructors together for complex-type data that are transparent to the engine 28 so that no materialization of intermediate results is necessary during non-aggregating complex scalar construction.
2. The implementation of complex-type constructing aggregators 42-46 as vector group-by aggregators so that well-known query rewrites allow pulling group-by aggregators up through Join operators.
3. The implementation of a query rewrite rule to merge complex-type constructing aggregators so that no materialization of intermediate results happens when constructing complex scalars by aggregation.

Accordingly, the optimizations provide the ability to merge group-by aggregators of complex scalars that aggregate parts of the same scalar (nested aggregators) into a single group-by aggregator, to form a "wide" row set with the sort order and grouping columns configured to allow streaming aggregation in the combined group-by aggregator, and to use transformation rules in the optimizer 34 to achieve the desired wide row set.

Combining Non-Aggregating Scalar Complex-Type Constructors:

Combining non-aggregating, scalar, complex-type constructors together for system complex types that are transparent to the engine 28 may be necessary to avoid materialization of intermediate results during complex scalar construction. Usually, this is not necessary in SQL SERVER 2005 from Microsoft Corporation, because FOR XML PATH syntax allows for formatting a row as XML data in one query, or sub-query. Such an optimization is needed for implementing SQL 2003 SL/XML publishing primitives and for complex-type constructs that DLinq support may require. An SQL/XML example is the following:

```
SELECT
    XMLElement ("PhoneNumber",
        XMLAttributes(phone_type as "type"),
        XMLElement("Number", phone_number)
    )
FROM Phones
```

The above example can be combined into the following equivalent:

```
SELECT
    (SELECT phone_type AS "@type", phone_number AS "Number"
    FOR XML PATH('PhoneNumber'), TYPE)
FROM Phones
```

The example of the merged XML construction in SQL/XML syntax is the following:

```
SELECT XMLGEN(
    '<PhoneNumber @type="{$phone_type}">
        <Number>{$phone_number}</Number>
    </PhoneNumber>',
    phone_type, phone_number)
FROM Phones
```

For complex-type construction other than XML construction, the query becomes the following:

```
SELECT
    construct_contact(
        construct_name(@first,@last),
        construct_address(@street,@city,@zip))
```

This query can be rewritten into the following:

```
SELECT
construct_complex_type(
    metadata:"contact(name($par1,$par2),address($par3,$par4,$par5)",
    @first,@last,@street,@city,@zip)
```

Merging Constructing Aggregators:

The main parameters of a complex-type aggregator 42-46 are the following: 1) result formatting metadata, 2) a set of input columns, and 3) an input order request. The merging of a complex aggregator with a nested aggregator results in the creation of a new aggregator. Instead of a given existing input column, the new aggregator has to process new additional input columns as a sub-group according to the nested aggregator metadata and using a given set of grouping columns. The nested aggregator's input order requests also are merged appropriately.

For the previously discussed example query that corresponds to the query tree 40 of FIG. 4, a simplified text representation of XML formatting metadata for the three XML aggregators 42-46 merged together can be the following:

```
<Contacts>
<?row Group1 GroupID="ID" ?>
    <Contact Category="{$category}">
        <Name>{$expr1}</Name>
```
```
        <PhoneNumbers>
        <?row Group2 GroupID="ContactID" ?>
            <PhoneNumber type="{$phone_type}">
            {$phone_number}</PhoneNumber>
        <?endrow Group2?>
        </PhoneNumbers>
        <Children>
        <?row Group3 GroupOn="ParentID" ?>
            <Child age="$(age)" sex="${sex}">{$name}</Child>
        <?endrow Group3?>
        </Children>
    </Contact>
<?endrow Group1?>
</Contacts>
```

Here, the XML processing instructions illustrate grouping directives.

For the merged aggregator to produce equivalent XML data in a streaming manner, one of the following "wide" row set representations for the Contacts table, the Phones table, and the Children table is constructed, as shown in the below table:

| id | category | first | last | contactid | phone_type | phone_number | age | sex | first | parentid |
|---|---|---|---|---|---|---|---|---|---|---|
| 1 | VIP | Peter | Fonda | 1 | Mobile | (555)123-4567 | NULL | NULL | NULL | NULL |
| 1 | VIP | Peter | Fonda | 1 | work | (555)456-7890 | NULL | NULL | NULL | NULL |
| NULL | NULL | NULL | NULL | NULL | NULL | NULL | 4 | Male | Nigel | 1 |
| 2 | VIP | Nancy | Shmidt | 2 | Mobile | (555)399-3367 | NULL | NULL | NULL | NULL |
| NULL | NULL | NULL | NULL | NULL | NULL | NULL | 11 | Female | Leah | 2 |
| NULL | NULL | NULL | NULL | NULL | NULL | NULL | 13 | Female | Helen | 2 |
| Data from Contacts table (Parent) | | | | Data from Phones table (Child1) | | | Data from Children table (Child2) | | | |

Left outer join ("LOJ") with join predicate Phones.ContactID=Contacts.ID over Contact and Phones
Full outer join with join predicate false over (Contacts LOJ Phones) and Children

40 or, the following wide row set representation (depending upon the initial order of the nested Apply operators):

| id | category | first | last | contactid | phone_type | phone_number | age | sex | first | parentid |
|---|---|---|---|---|---|---|---|---|---|---|
| 1 | VIP | Peter | Fonda | 1 | Mobile | (555)123-4567 | NULL | NULL | NULL | NULL |
| 1 | VIP | Peter | Fonda | 1 | Work | (555)456-7890 | NULL | NULL | NULL | NULL |
| 1 | VIP | Peter | Fonda | NULL | NULL | NULL | 4 | Male | Nigel | 1 |
| 2 | VIP | Nancy | Shmidt | 2 | Mobile | (555)399-3367 | NULL | NULL | NULL | NULL |
| 2 | VIP | Nancy | Shmidt | NULL | NULL | NULL | 11 | Female | Leah | 2 |
| 2 | VIP | Nancy | Shmidt | NULL | NULL | NULL | 13 | Female | Helen | 2 |
| Data from Contacts table (Parent) | | | | Data from Phones table (Child1) | | | Data from Children table (Child2) | | | |

Full outer join ("FOJ") with join predicate false over Phones and Children
Right outer join with join predicate Phones.ContactID=Contacts.ID OR Children.ParentID=Contacts.ID over (Phones FOJ Children) and Contacts Query Transformations for Complex-Type Constructing Aggregators:

There are two different types of equivalence rewrite transformations that can be performed by the optimizer 34 to help achieve a constructing aggregation query plan having improved performance characteristics. These two types of equivalence rewrite transformations include the following: 1) standard equivalence rewrites, and 2) equivalence rewrites that include pulling constructing aggregators 42-46 over Apply operators 48 and 50 with aggregation merging, which are discussed below. These transformations change the operators in the query tree 40 in such a way that the correctness of the query is not sacrificed, while improving the efficiency of the resulting query.

Standard Equivalence Rewrites:

Moving constructing aggregators 42-46 around Apply operators 48 and 50 without merging them with other constructing aggregators constitutes the first area where equivalence rewrites are applied. Since constructing aggregation can be regarded as a special case of relational aggregation with ordered input, well-known standard equivalence rewriting techniques from relational database query optimization can apply.

Equivalence Rewrites for Pulling Constructing Aggregators over Apply Operators with Aggregation Merging:

The second type of equivalence rewrite transformations is characterized by moving constructing aggregators 42-46 above an Apply operator 48 and 50, or another type of Join operator, and merging the constructing aggregators together. In order for this second type of equivalence rewrite transformation to be appropriate, the query tree 40 includes both an aggregator 42 on top of the Apply operator and an aggregator 44 and 46 below the Apply operator.

Figure 5A:
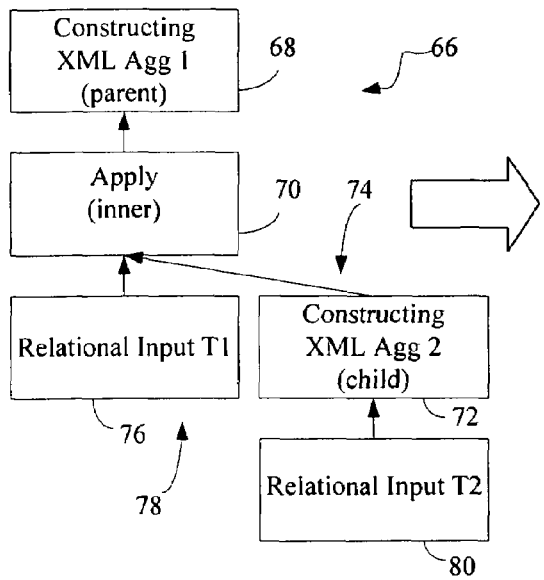
FIGS. 5A-B are block diagrams of example query trees that illustrate a transformation of a query tree according to a preferred embodiment, where a child aggregator is on the right-hand side of an Apply operator.
Figure 5B:
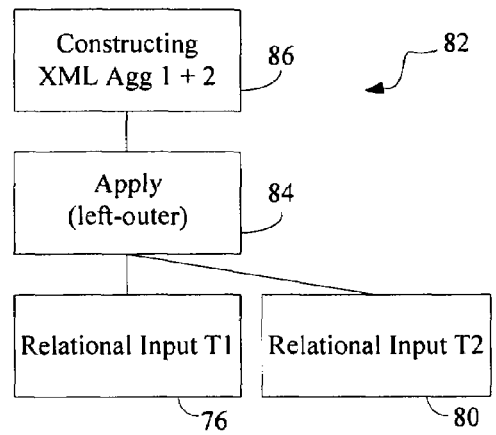

Transformation to Merge a Child Aggregator into a Parent Aggregator:

Referring additionally to FIGS. 5A-B, the equivalence rewrite transformation works on portions 66 of the query tree 40 that include a first constructing aggregator 68 directly on top of an Apply operator 70 in addition to a second constructing aggregator 72 directly below the Apply operator in its right-hand child 74. These two aggregators 68 and 72 are denoted as the parent aggregator 68 and child aggregator 72, respectively. The portion 66 of the query tree also includes a first relational input 76, Relational Input T1, in the left-hand child 78, and a second relational input 80, Relational Input T2, in the right-hand child 74. An important prerequisite of the parent aggregator 68 in this equivalence rewrite transformation is that the parent aggregator 68 is not the result of a merger of two other aggregators.

As shown in the transformation represented by the change in the portion 66 of the query tree 40 from FIG. 5A to FIG. 5B, a semantically equivalent tree 82 replaces the inner Apply operator 70 from FIG. 5A with a left-outer Apply operator 84 with the same join predicate, and the child aggregator 72 is moved on top of the Apply operator 84 and collapsed with the parent aggregator 68 to form a merged aggregator 86. Changing the join type of the Apply operator from inner to left-outer is necessary in order to address cases where the input to the aggregator is empty. An inner join type results in all rows from the result table that do not have corresponding rows in both the left-hand and right-hand relational input tables being discarded. In contrast, an outer join type preserves all unmatched rows. The left-outer join type preserves unmatched rows from the left-hand relational input table but discards unmatched rows from the right-hand relational input table. In contrast, the right-outer join type (mentioned later) preserves unmatched rows from the right-hand relational input table but discards unmatched rows from the left-hand relational input table. The full-outer join type (mentioned later) combines the functions of the left-outer join type and the right-outer join type, thus, it retains the unmatched rows from both the left-hand and right-hand relational input tables. In this case, the join type of the Apply operator is changed from inner to left-outer to ensure that all of the rows from the left-hand side, i.e., the parent side, of the Apply operator are passed through the Apply operator and into the merged aggregator.

Figure 6A:
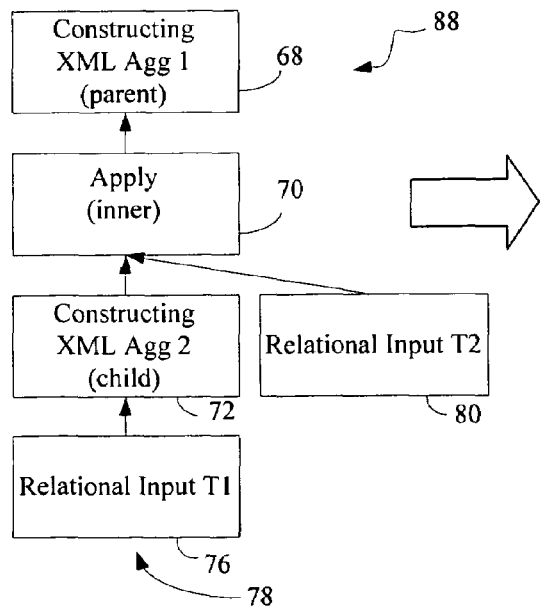
FIGS. 6A-B are block diagrams of example query trees that illustrate the transformation of FIGS. 5A-B, where the child aggregator is on the left-hand side of the Apply operator.
Figure 6B:
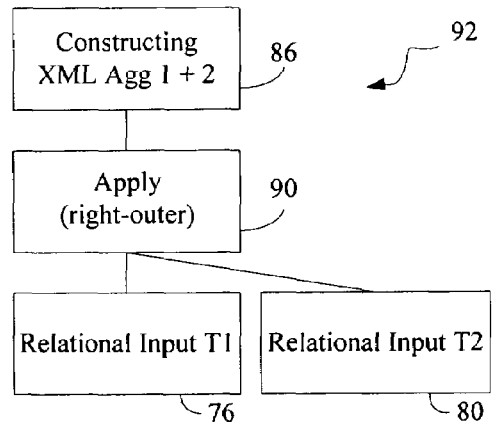

A symmetric transformation for a query tree portion 88 where the child aggregator 72 is in the left-hand child 78 of the Apply operator 70 is illustrated in FIGS. 6A-B. In this case, the join type of the Apply operator is changed from a inner join to a right-outer join (see the Apply operator 90 in the query tree portion 92 of FIG. 6B) to make sure that all of the row sets from Relational Input T2 80 are passed on to the merged aggregator 86.

In the query tree portion 82 illustrated in FIG. 5B, if the Contacts table from the previously discussed example is Relational Input T1 76 and the Phones table is Relational Input T2 80, the input to the merged aggregator 86, which is located on top of the Apply operator 84, is the following wide row set for the Contacts table and the Phones table:

| id | cate-gory | first | last | contactid | phone_type | phone_number |
|---|---|---|---|---|---|---|
| 1 | VIP | Peter | Fonda | 1 | Mobile | (555)123-4567 |
| 1 | VIP | Peter | Fonda | 1 | work | (555)456-7890 |
| 2 | VIP | Nancy | Shmidt | 2 | Mobile | (555)399-3367 |

Figure 7A:
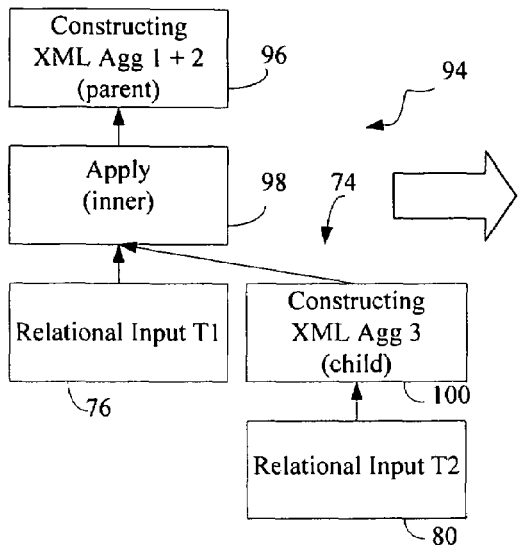
FIGS. 7A-B are block diagrams of example query trees that illustrate another transformation of a query tree according to a preferred embodiment, where a parent aggregator is a merged aggregator and a child aggregator is on the right-hand side of an Apply operator.
Figure 7B:
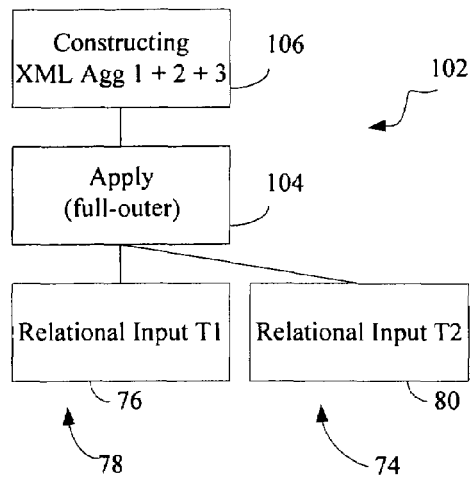

Transformation to Merge a Child Aggregator into an Already Merged Aggregator:

Referring additionally to FIGS. 7A-B, the equivalence rewrite transformations, according to embodiments of the present invention, work on a query tree portion 94 having a first constructing aggregator 96 located on top of an Apply operator 98 in addition to a second constructing aggregator 100 located below the Apply operator in its right-hand child 74. These two aggregators are denoted as the parent aggregator 96 and the child aggregator 100, respectively, in the following discussion. In this case, an important property of the parent aggregator is that the parent aggregator is a merged aggregator that resulted from the previous merging of another parent aggregator and another child aggregator, e.g., the parent aggregator 68 and the child aggregator 72 of FIGS. 5A and 6A.

Figure 8A:
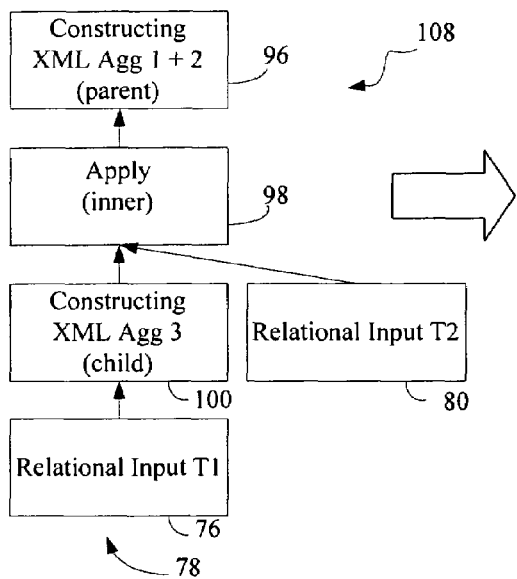
FIGS. 8A-B are block diagrams of example query trees that illustrate the transformation of FIGS. 7A-B, where the child aggregator is on the left-hand side of an Apply operator.
Figure 8B:
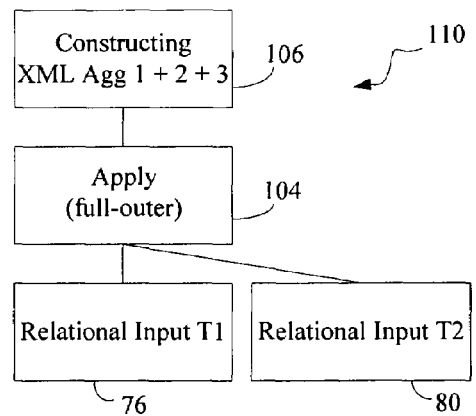

A semantically equivalent query tree portion 102, shown in FIG. 7B, replaces the inner Apply operator 98 with a full-outer Apply operator 104 having a false join predicate, moves the child aggregator 100 on top of the Apply operator 104, and collapses the child aggregator with the parent aggregator 96 resulting in a merged aggregator 106. The false join predicate makes sure that no row from the left-hand child 78 and the right-hand child 74 match. The join type for the Apply operator is changed from the inner type to the full-outer type in order to address cases where one of the relational inputs 76 and 80 is empty. In these cases, it must be ensured that all rows from the left-hand side of the Apply operator are passed through the Apply operator and into the merged aggregator. A symmetric transformation for the case where the child aggregator 100 is in the Apply operator's left-hand child 78 is shown in the query tree portions 108 and 110 of FIGS. 8A and 8B, respectively.

The query tree transformation illustrated in FIGS. 7A-B ensure the following: that the merged aggregator 106 after the transformation sees all of the rows and the same columns as the initial aggregators 96 and 100, and that the merged aggregator can distinguish between data from Relational Inputs T1 76 and T2 80 in order to mark them up properly. The wide row set that serves as the input into the resulting merged aggregator is shown in the following table:

| id | category | first | last | contactid | phone_type | phone_number | age | sex | first | parentid |
|---|---|---|---|---|---|---|---|---|---|---|
| 1 | VIP | Peter | Fonda | 1 | Mobile | (555)123-4567 | NULL | NULL | NULL | NULL |
| 1 | VIP | Peter | Fonda | 1 | work | (555)456-7890 | NULL | NULL | NULL | NULL |
| NULL | NULL | NULL | NULL | NULL | NULL | NULL | 4 | Male | Nigel | 1 |
| 2 | VIP | Nancy | Shmidt | 2 | Mobile | (555)399-3367 | NULL | NULL | NULL | NULL |
| NULL | NULL | NULL | NULL | NULL | NULL | NULL | 11 | Female | Leah | 2 |
| NULL | NULL | NULL | NULL | NULL | NULL | NULL | 13 | Female | Helen | 2 |

Figure 9A:
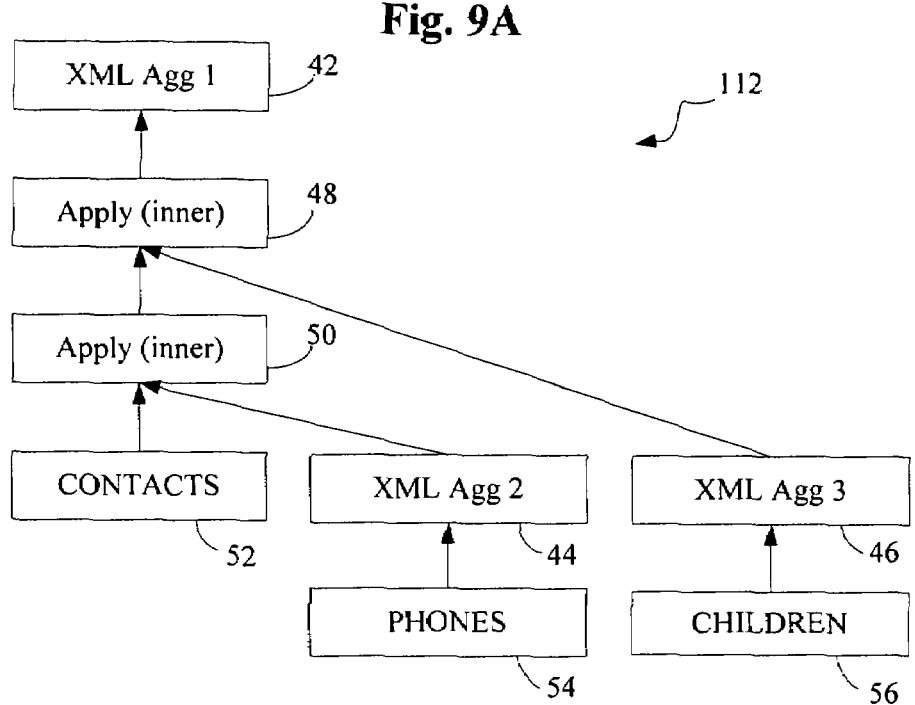
FIGS. 9A-D are block diagrams of example query trees that illustrate the transformation of the query tree illustrated in FIG. 4 using the transformations of FIGS. 5A-B and 7A-B.

Transformation Algorithm:

Referring again to FIG. 4, given the previously discussed equivalence rewrite transformations, which are illustrated in FIGS. 5A-B, 6A-B, 7A-B, and 8A-B, the transformations are applied repeatedly to a query tree 40 until all of the sub-query XML aggregators 44 and 46 are pulled up, and merged with the top-level aggregator 42. FIGS. 9A-D illustrate the transformation of the query tree illustrated in FIG. 4 from its original tree structure 112 without the filters 58 and 60, as shown in FIG. 9A, to its tree structure 114 in FIG. 9D after the transformations are complete.

Figure 9B:
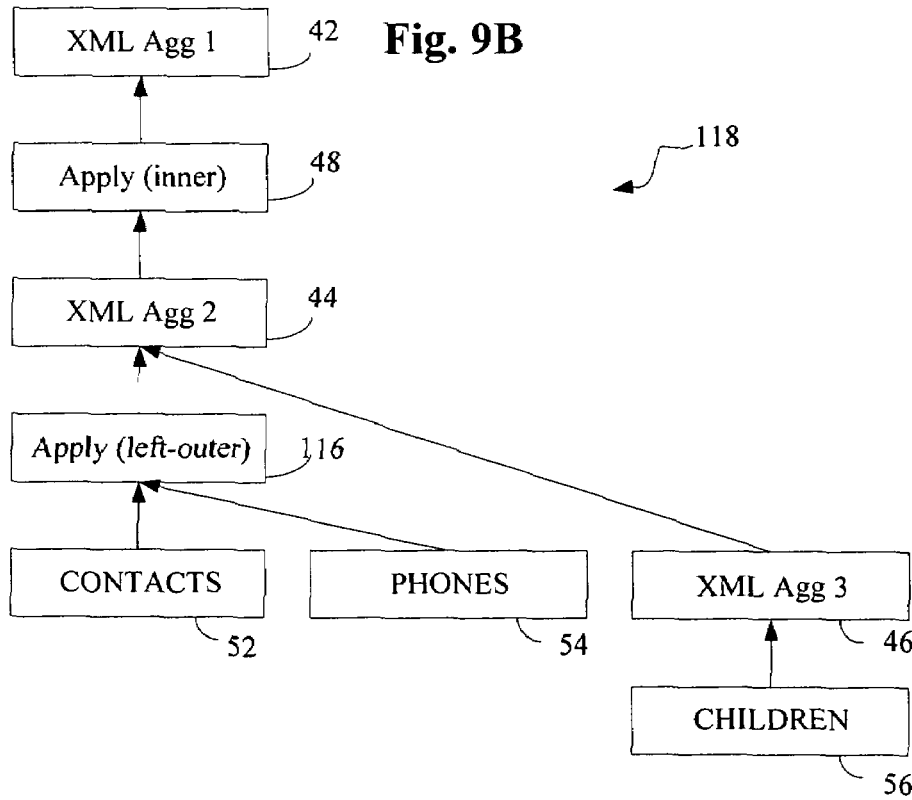

More specifically, between FIGS. 9A and 9B, the equivalence rewrite transformation illustrated in FIGS. 5A-B is applied to the second aggregator 44, i.e., XML Agg 2. During the transformation, the second inner Apply operator 50 in FIG. 9A is converted to a left-outer Apply operator 116, and the second aggregator is moved immediately above the left-outer Apply operator, as shown in the modified tree structure 118 of FIG. 9B. Next, the first aggregator 42, i.e., XML Agg 1, and the second aggregator 44 are merged into a first merged aggregator 120, i.e., XML Agg 1+2 (see tree structure 122).

Figure 9C:
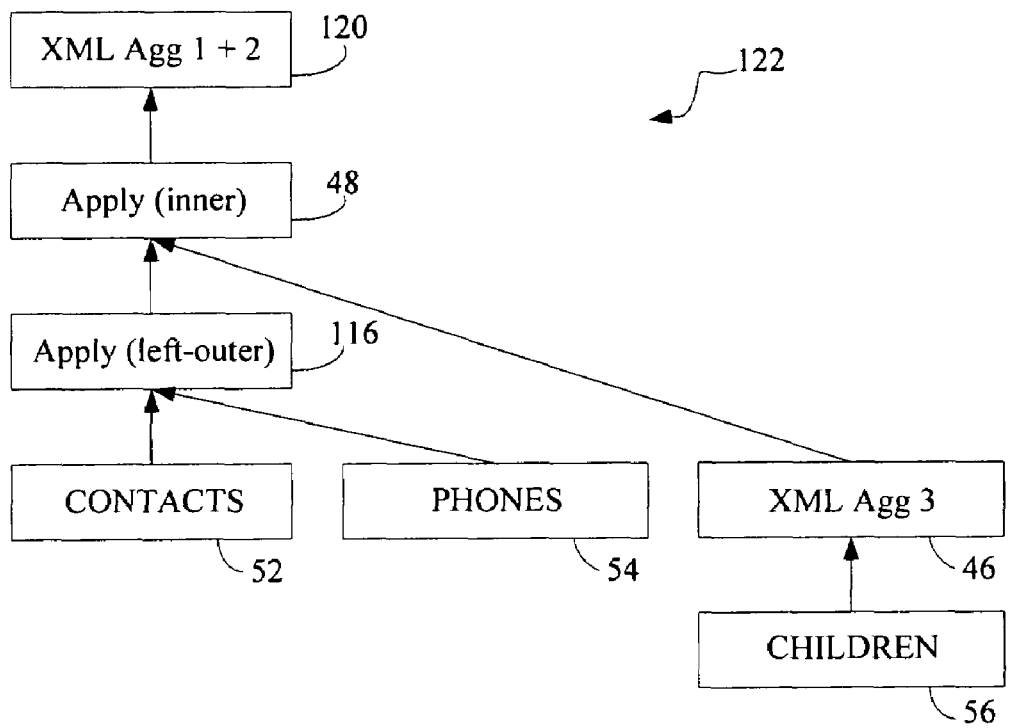
Figure 9D:
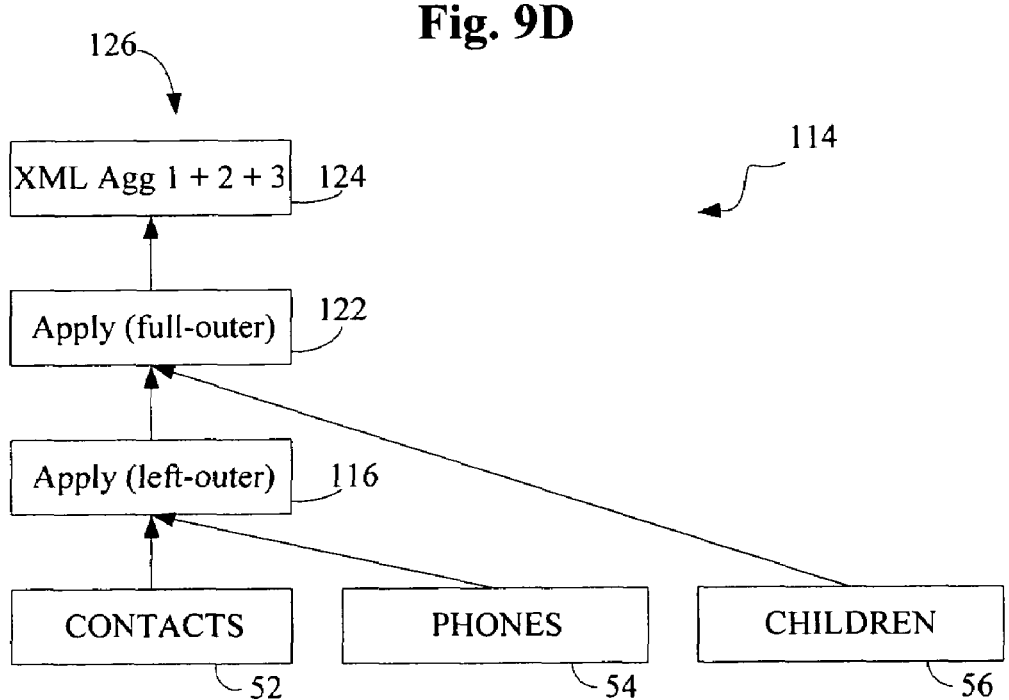

As illustrated in FIGS. 9C-D, the equivalence rewrite transformation illustrated in FIGS. 7A-B is applied to the third aggregator 46, i.e., XML Agg 3, resulting in the first Apply operator 48 being converted from an inner Apply operator to a full-outer Apply operator 122. Also, as illustrated in FIG. 9D, the third aggregator has been moved above the full-outer Apply operator and merged with the first merged aggregator 120, i.e., XML Agg 1+2, resulting in a second merged aggregator 124, i.e., XML Agg 1+2+3. Referring specifically to FIG. 9D, the resulting transformation advantageously only includes one merged aggregator 124.

Query Plan Properties:

After all of the aggregators 42-46 have been moved to the top 126 of the query tree 114 and above the Apply operators 116 and 122, the query tree can be de-correlated by using standard query optimizer techniques. This ensures that the Apply operators included in the query tree are converted into regular Join operators, e.g., Hash-Join operators or Merge-Join operators, which usually have better performance characteristics than Nested-Loop Join operators. These transformation processes can be stopped in cases where the transformations do not apply, i.e., cases where the transformation process can not be performed.

In order to avoid unnecessary sorts for the final merged aggregator 124, the full-outer Apply operator 122 needs to be implemented as a Merge-Join operator that preserves proper parent-child relationships between rows from its left-hand and right-hand inputs when these inputs are already in the proper order.

Optimizer Algorithm:

An exemplary algorithm 128 that represents the steps taken by the optimizer 34 is illustrated in FIG. 10. This algorithm can be implemented in computer-executable instructions that are stored in a computer-readable medium, e.g., the database server's storage device 12. After the start 130 of the algorithm, the next step 132 of the algorithm is for the optimizer to identify a first aggregator 42, 68, 96, and 120 in the query tree 40, 66, 88, 94, 108, 112, and 122. In the next step 134, the optimizer identifies a second aggregator 44, 46, 72, and 100 below the first aggregator in the query tree. In step 136, the optimizer identifies an Apply operator 48, 50, 70, and 98, between the first aggregator and the second aggregator. In step 138, the optimizer merges the second aggregator with the first aggregator, resulting in a merged aggregator 86, 106, 120, and 124 (see FIGS. 5A-B, 6A-B, 7A-B, 8A-B, and 9A-D).

In the next step 140, the optimizer 34 checks if the first aggregator 42, 68, 96, and 120 is a merged aggregator 86, 106, 120, and 124 before the first aggregator is merged with the second aggregator 44, 46, 72, and 100. If so, the optimizer changes the join type of the Apply operator 48, 50, 70, and 98 from inner to full-outer with a false predicate at step 142 (see FIGS. 7A-B, 8A-B, and 9C-D). If not, the optimizer checks if the second aggregator is a right-hand child to the Apply operator at step 144. If so, then the optimizer changes the join type of the Apply operator from inner to left-outer at step 146 (see FIGS. 5A-B). If not, then the second aggregator is a left-hand child, and the optimizer changes the join type of the Apply operator from inner to right-outer at step 148 (see FIGS. 6A-B). Next, the optimizer de-correlates the Apply operator into Hash-Join operators and/or Merge-Join operators at step 150. In the next step 152, the optimizer checks if there are any further aggregators to merge in the query tree 40, 66, 88, 94, 108, 112, and 122. If so, the algorithm 128 returns to step 130. If not, i.e., all of the aggregators already have been merged or none of the algorithm's transformations apply to the query tree, the algorithm ends at step 154.

Advantageously, the above embodiments are transformations that result in a single merged aggregator 124. Having a single aggregator ensures that any piece of XML data is written to the XML aggregator output only once, which eliminates the inefficiencies associated with rewrites of the data. In the previously discussed embodiments, the aggregators 44 and 46 are, in effect, pulled up through Apply operators 48 and 50 and merged into the single merged aggregator. This provides the advantage of processing the merged aggregator in a single step instead of processing multiple aggregators. Since the aggregators are merged into a single aggregator, the need for more than one copy of scalar data is eliminated. In addition, implementing XML serialization in one integrated step typically performs better than serializing in many different places throughout the query plan. While many of the above examples involve XML aggregators, it is to be understood that the subject matter of the present document includes other types of aggregators in addition to XML aggregators.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the following claims. Moreover, although the term "step" may be used herein to connote different aspects of methods employed, the term should not be interpreted as implying any particular order among or between various steps herein disclosed unless and except when the order of individual steps is explicitly described.

What is claimed is:

1. A method for transforming a query tree that includes more than one aggregator, the method implemented on a processor coupled to a memory, the method comprising:
   a. identifying a first aggregator in the query tree;
   b. identifying a second aggregator that is located below the first aggregator in the query tree;
   c. identifying an apply operator between the first and second aggregators in the query tree;
   d. merging the second aggregator with the first aggregator to form a merged aggregator;
   e. determining whether the first aggregator is a merged aggregator before the merging of the first and second aggregators;
   f. if the first aggregator is a merged aggregator before the merging of the first and second aggregators, changing a join type of the apply operator from inner to full-outer with a false predicate;
   g. if the first aggregator is not a merged aggregator before the merging of the first and second aggregators, determining whether the second aggregator is a right-hand child to the apply operator before the merging of the first and second aggregators;
   h. if the second aggregator is a right-hand child to the apply operator before the merging of the first and second aggregators, changing a join type of the apply operator from inner to left-outer; and
   i. if the second aggregator is not a right-hand child to the apply operator before the merging of the first and second aggregators, changing a join type of the apply operator from inner to right-outer.

2. The method according to claim 1, wherein:
   a. the method further comprises:
      i. identifying a first relational input that is input to the apply operator, and
      ii. identifying a second relational input that is input to the second aggregator before the transformation of the query tree;
   b. wherein the second relational input is input to the apply operator after the transformation of the query tree.

3. The method according to claim 1, further comprising creating a row set that is:
   a. configured to be aggregated by the merged aggregator;
   b. configured to avoid materialization of intermediate results during aggregation; and
   c. configured to allow the merged aggregator to perform streaming aggregation.

4. The method according to claim 1, wherein the first aggregator, the second aggregator, and the merged aggregator are complex aggregators.

5. The method according to claim 1, wherein the first aggregator, the second aggregator, and the merged aggregator are XML aggregators.

6. A computer storage medium having computer-executable instructions for performing a method of transforming a query tree, the method comprising:
   a. identifying a first aggregator in the query tree;
   b. identifying an apply operator having a join type below the first aggregator in the query tree;
   c. identifying a second aggregator that is located below the apply operator in the query tree;
   d. merging the second aggregator with the first aggregator to form a merged aggregator;
   e. determining whether the first aggregator is a merged aggregator before the merging of the first and second aggregators; and
   f. if the first aggregator is a merged aggregator before the merging of the first and second aggregators, changing a join type of the apply operator from inner to full-outer with a false predicate;
   g. if the first aggregator is not a merged aggregator before the merging of the first and second aggregators, determining whether the second aggregator is a right-hand child to the apply operator before the merging of the first and second aggregators;
   h. if the second aggregator is a right-hand child to the apply operator before the merging of the first and second aggregators, changing a join type of the apply operator from inner to left-outer; and
   i. if the second aggregator is not a right-hand child to the apply operator before the merging of the first and second aggregators, changing a join type of the apply operator from inner to right-outer; and
   j. creating a row set that is:
      i. configured to be aggregated by the merged aggregator,
      ii. configured so that no materialization of intermediate results is necessary during aggregation, and
      iii. configured to allow the merged aggregator to perform streaming aggregation.

7. A computer-implemented database system for executing a database query, the computer database system comprising:
   a. a database server computer coupled to a database storage device that stores information in a database, the database query to be executed upon the information stored in the database;
   b. a database management system that is configured both to receive the database query and to convert the database query into a query tree;
   c. wherein:
      i. the database management system includes an optimizer that is configured to transform the query tree,
      ii. the query tree includes:
         A. a first aggregator, and
         B. a second aggregator that is located below the first aggregator, and
      iii. the optimizer transforms the query tree by merging the second aggregator with the first aggregator to form a merged aggregator, the optimizer:
         A. determines whether the first aggregator is a merged aggregator before the merging of the first and second aggregators;
         B. if the first aggregator is a merged aggregator before the merging of the first and second aggregators, as the optimizer transforms the query tree, the optimizer changes a join type of the apply operator from inner to full-outer with a false predicate;
         C. if the first aggregator is not a merged aggregator before the merging of the first and second aggregators, the optimizer determines whether the second aggregator is a right-hand child to the apply operator before the merging of the first and second aggregators;

D. if the second aggregator is a right-hand child to the apply operator before the merging of the first and second aggregators, as the optimizer transforms the query tree, the optimizer changes a join type of the apply operator from inner to left-outer; and E. if the second aggregator is not a right-hand child to the apply operator before the merging of the first and second aggregators, as the optimizer transforms the query tree, the optimizer changes a join type of the apply operator from inner to right-outer.

8. The computer-implemented database system according to claim 7, wherein the optimizer creates a row set that is:
   a. configured to be aggregated by the merged aggregator;
   b. configured to avoid materialization of intermediate results during aggregation; and
   c. configured to allow the merged aggregator to perform streaming aggregation.

* * * * *